United States Patent [19]
Seifert

[11] Patent Number: 5,897,171
[45] Date of Patent: Apr. 27, 1999

[54] APPARATUS AND METHOD FOR MOUNTING A TIRE

[76] Inventor: Thomas G. Seifert, 2533 NW. 56th St., Oklahoma City, Okla. 73112-7140

[21] Appl. No.: 08/979,050

[22] Filed: Nov. 26, 1997

Related U.S. Application Data

[63] Continuation-in-part of application No. 08/774,959, Dec. 27, 1996, Pat. No. 5,716,105, which is a continuation-in-part of application No. 08/723,676, Sep. 30, 1996, abandoned.

[51] Int. Cl.$^6$ ..................................................... B25B 27/14
[52] U.S. Cl. ..................... 301/35.62; 29/273; 254/DIG. 5
[58] Field of Search ................................. 301/5.1, 35.62, 301/38.1, 40.2, 111; 29/273, 271; 254/DIG. 5

[56] References Cited

U.S. PATENT DOCUMENTS

| | | | |
|---|---|---|---|
| 1,384,405 | 7/1921 | Putnam | 29/273 X |
| 1,494,269 | 5/1924 | Meyers | 29/273 |
| 1,612,124 | 12/1926 | Huelsick | 254/DIG. 5 |
| 1,735,124 | 11/1929 | Miller | 29/273 |
| 1,738,682 | 12/1929 | Baker | 301/36.1 |
| 1,775,008 | 9/1930 | Waters | 301/36.1 |
| 1,815,821 | 7/1931 | Baker | 29/273 |
| 1,999,206 | 4/1935 | Patterson | 29/273 |
| 2,317,311 | 4/1943 | Stough | 301/9 |
| 2,640,728 | 6/1953 | Slack | 29/273 X |
| 2,640,729 | 6/1953 | Niven | 301/9 |
| 2,662,728 | 12/1953 | Hanes et al. | 254/DIG. 5 |
| 2,708,712 | 5/1955 | Jamieson | 29/273 X |
| 2,866,356 | 12/1958 | Elam | 254/DIG. 5 |
| 3,048,919 | 8/1962 | Bald | 29/273 |
| 3,960,047 | 6/1976 | Liffick | 301/111 |
| 3,973,283 | 8/1976 | Boe | 7/1 E |
| 4,097,979 | 7/1978 | Interdonato | 29/273 |
| 4,602,415 | 7/1986 | Garcia | 29/273 |
| 4,847,971 | 7/1989 | Gevas | 301/35.62 X |
| 4,949,448 | 8/1990 | Hebnes | 29/273 |
| 5,022,133 | 6/1991 | Weitekamo | 29/273 |
| 5,479,692 | 1/1996 | Barkus | 29/468 |

FOREIGN PATENT DOCUMENTS

| | | | |
|---|---|---|---|
| 1261522 | 4/1961 | France | 301/35.62 |
| 800022 | 8/1950 | Germany | 29/273 |

*Primary Examiner*—Russell D. Stormer
*Attorney, Agent, or Firm*—McAfee & Taft

[57] ABSTRACT

Apparatus and methods for facilitating replacement of a vehicle wheel and eliminating the frustrations associated with the alignment of lug bolts with holes in the replacement wheel. The invention may be included in new vehicles or retrofitted by the owners of older vehicles. The apparatus comprises an elongated support member extending from a hub of a vehicle adjacent to lug bolts also extending from the hub or hub holes in the hub. The hub is rotated so that the support member is in the topmost position, and the replacement wheel is hung on the support member. Gravity insures that the holes in the wheel are aligned with the lug bolts so that it is easy to push laterally on the wheel to engage the lug bolts in the holes. The support member may include one lug bolt which is longer than the others or a dedicated guide pin attached to the hub. In another embodiment, one of the holes is enlarged, and a topmost lug bolt is elongated by slipping a guide tube over it after inserting the tube through the enlarged wheel hole. The tube can be included in a kit along with a machining tool for enlarging the hole. To further ease the task, the tube may be beveled at the end which slips onto the lug bolt and then used as a lever to lift the tire into place. The beveled end allows for easy positioning of the guide tube even when the guide tube is disposed at an angle to the lug bolt. The invention is readily adaptable to various vehicles.

15 Claims, 5 Drawing Sheets

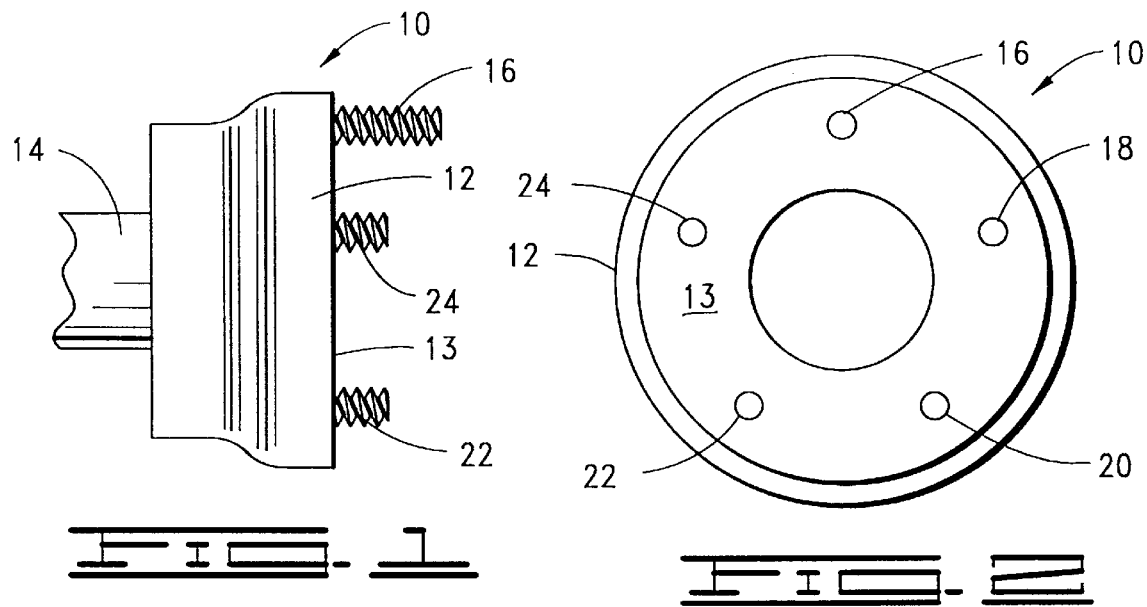
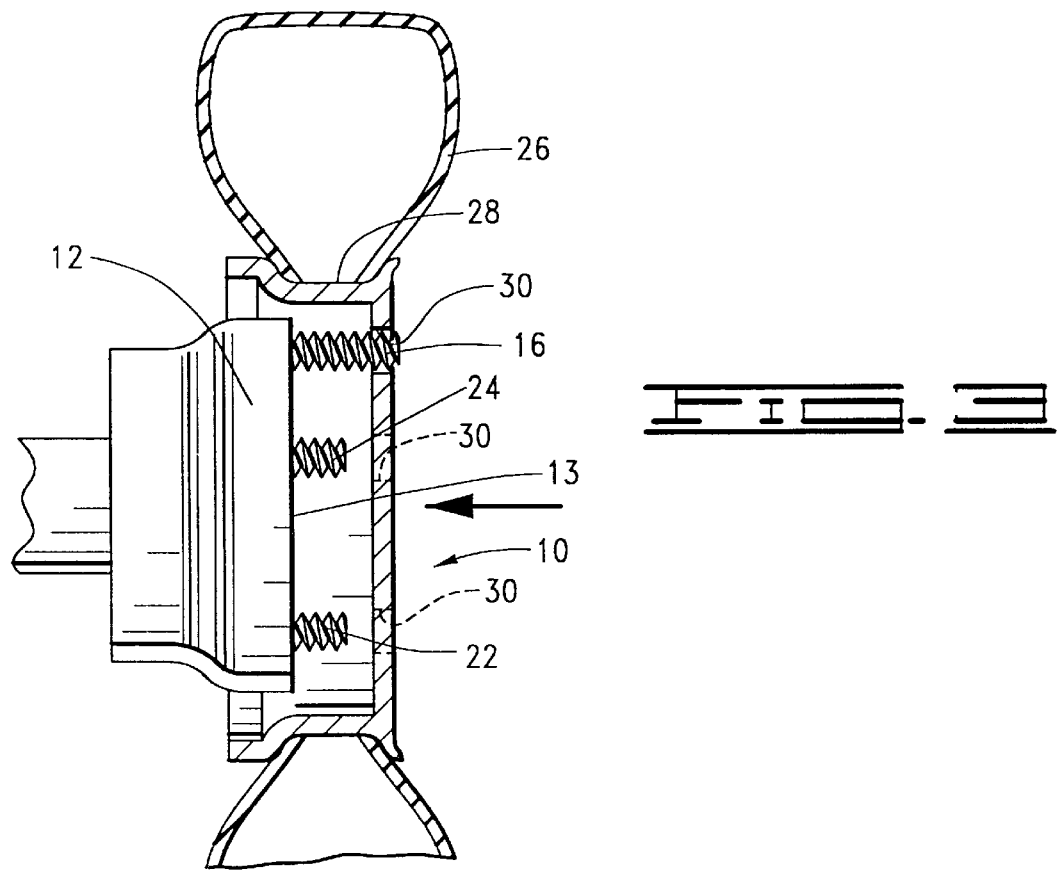

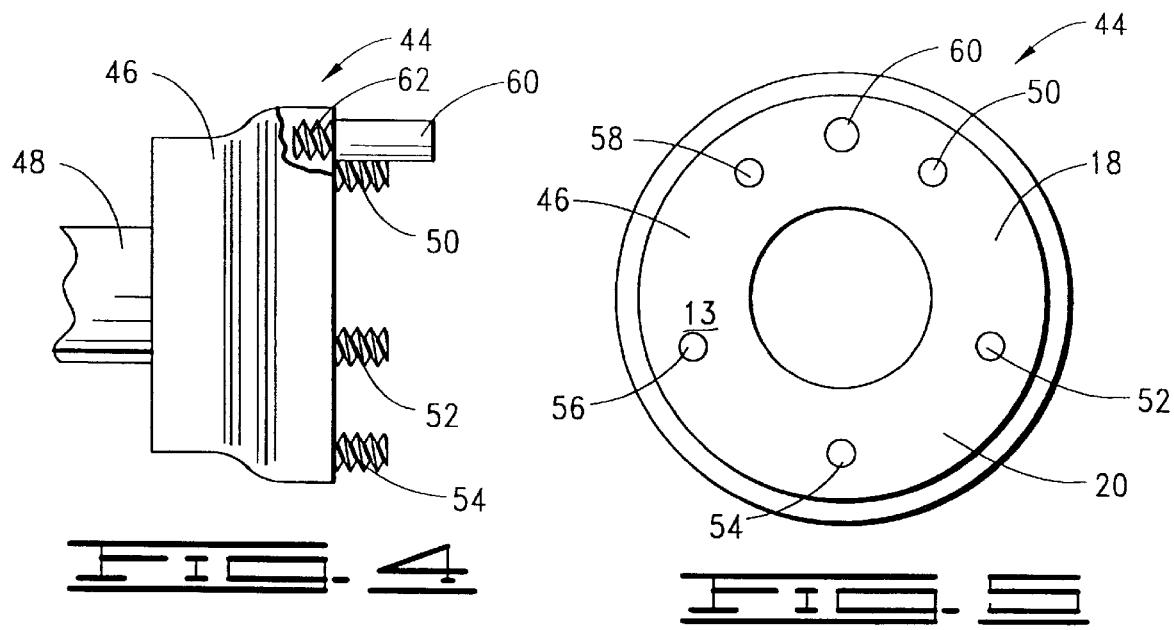
FIG. 4
FIG. 5
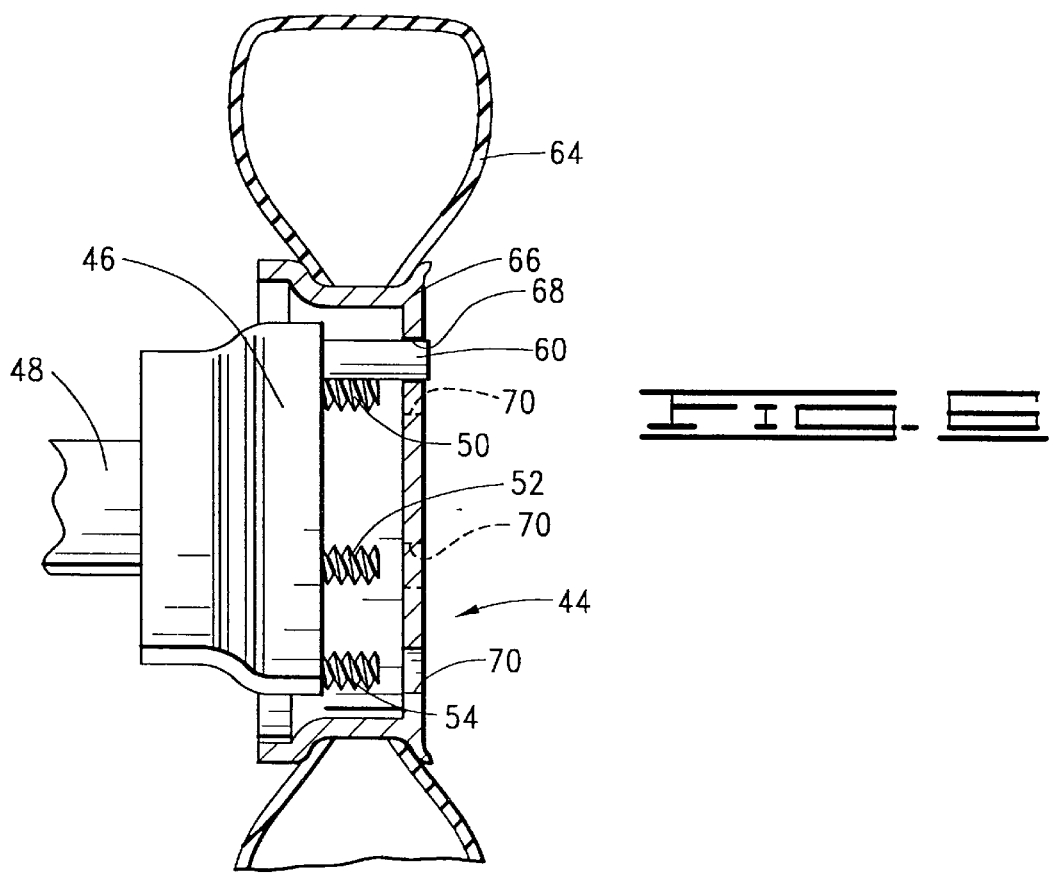
FIG. 6

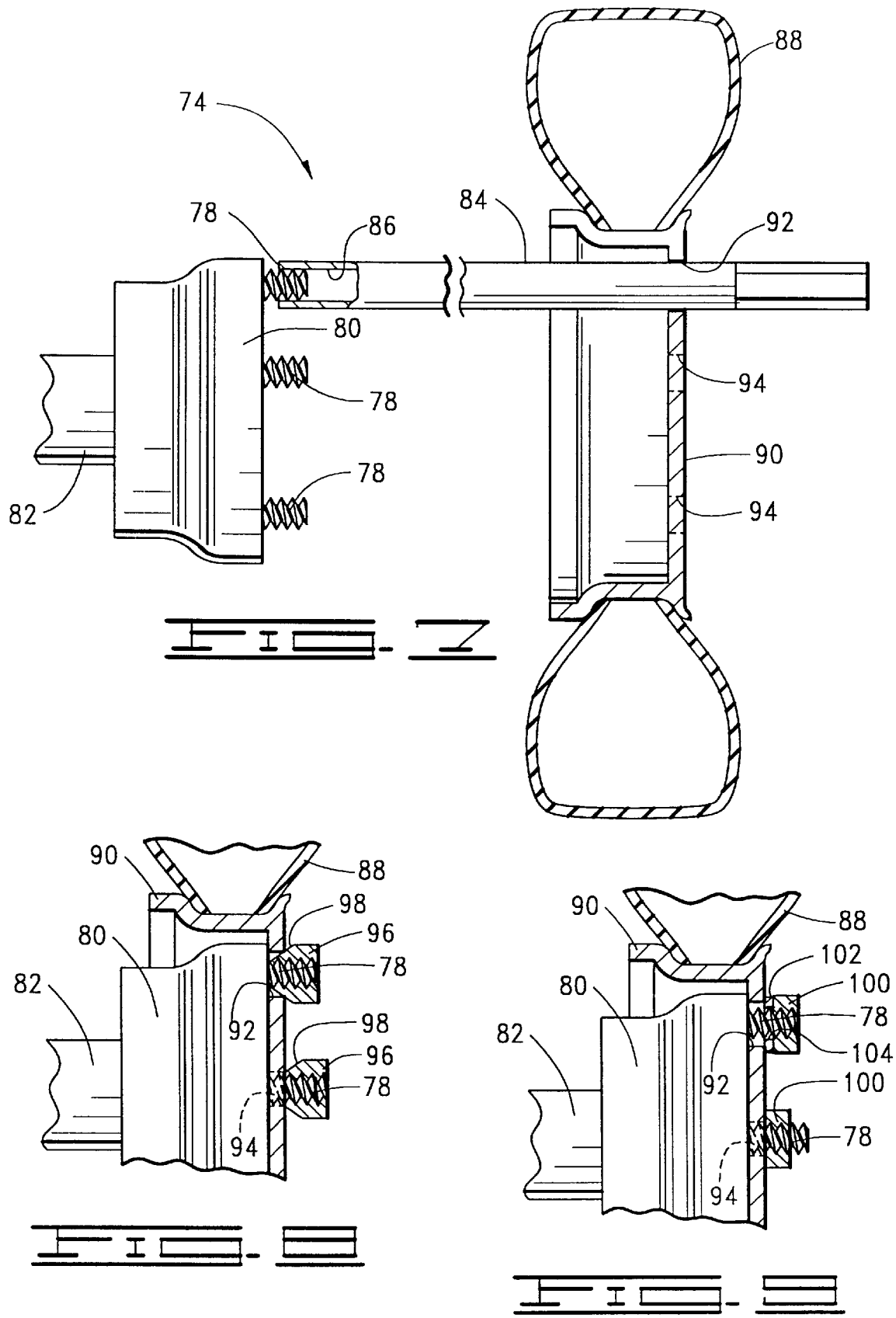

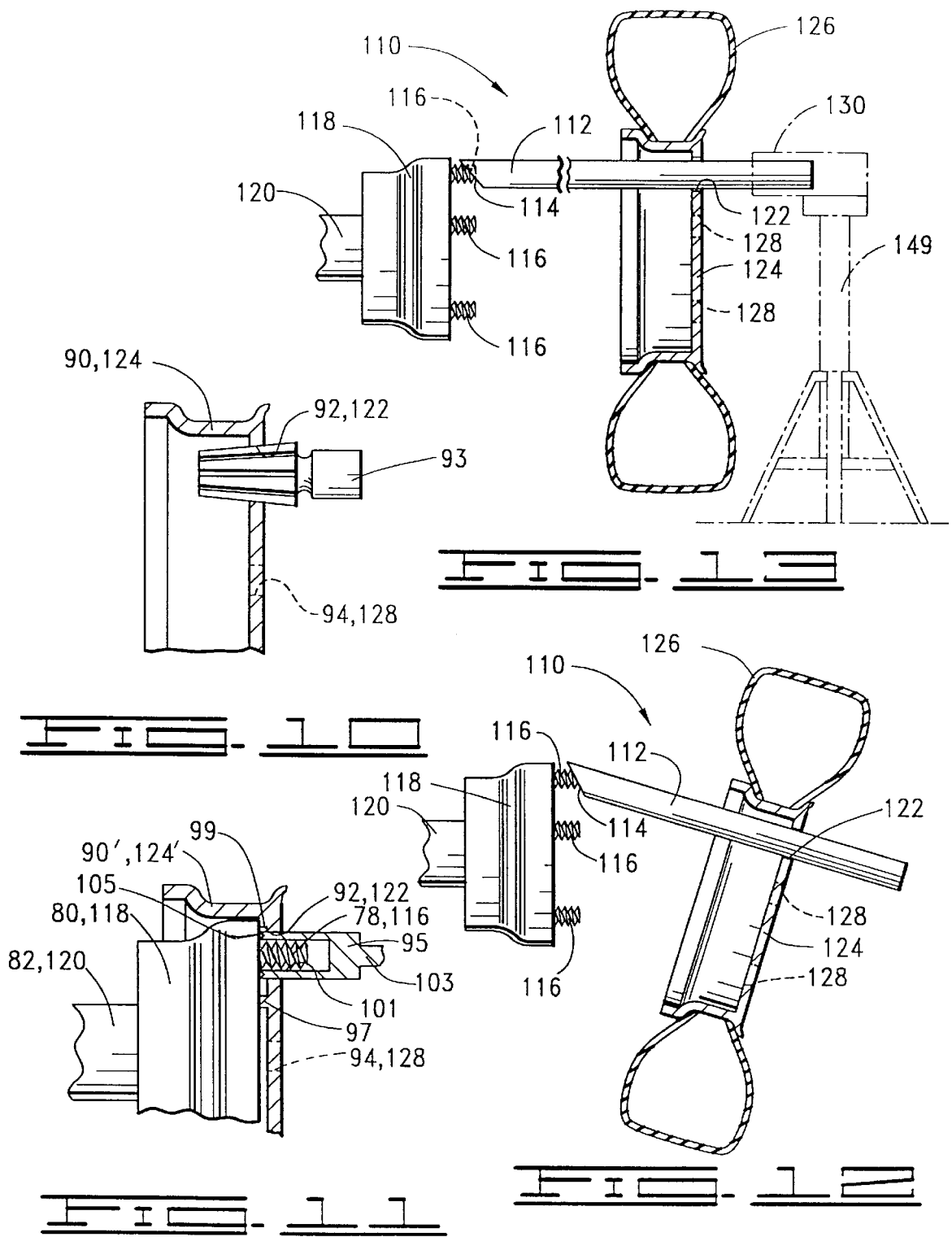

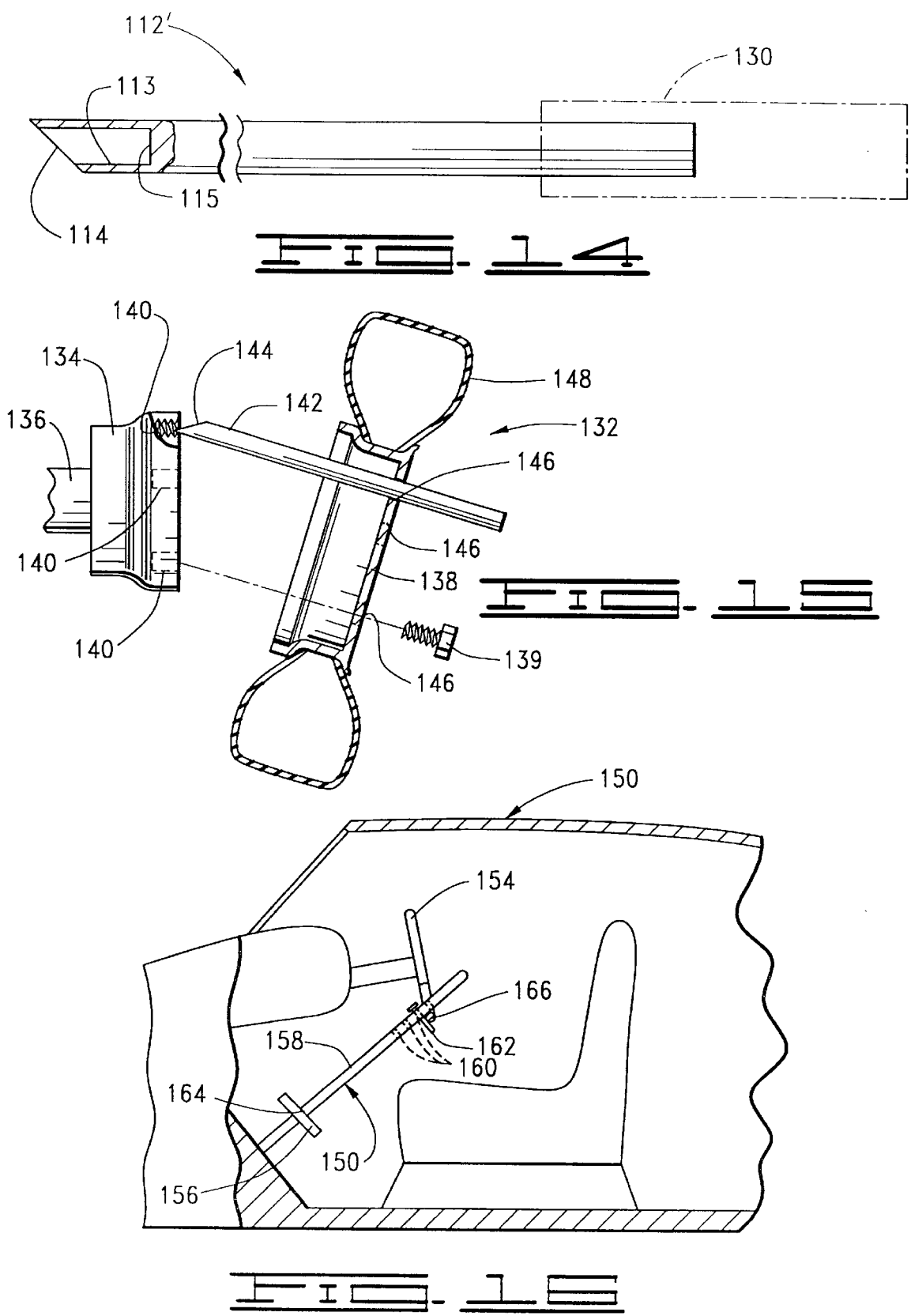

5,897,171

APPARATUS AND METHOD FOR MOUNTING A TIRE

This is a continuation in part of application Ser. No. 08/774,959 filed Dec. 27, 1996, now U.S. Pat. No. 5,716,105 which is a continuation in part of application Ser. No. 08/723,676 filed Sep. 30, 1996, now abandoned.

BACKGROUND OF THE INVENTION

1. Field of the Invention

This invention relates generally to apparatus and methods of mounting tires on vehicles, and more particularly, to an improved lug bolt configuration and an adapter for use with a standard lug bolt configuration which enable tire and wheel changes with reduced effort and attendant problems.

2. Description of the Prior Art

The prior art of mounting vehicle wheels includes the long-used plurality of lug bolts, such as four or five, which extend from a wheel face plate of a type which has been used for a very long time with little or no change in the basic design. The most frustrating and difficult task in changing tires is the alignment of the lug bolts with the corresponding holes in the replacement wheel. It is necessary to lift the wheel and tire, which can have considerable weight, and simultaneously align the holes in the wheel with the lug bolts. The present invention eliminates the frustration and meets the need for easier alignment of wheel holes and lug bolts by having a support member from which the wheel may be hung. This can be accomplished by the manufacturer of the vehicle or can be retrofitted to an older vehicle by the owner.

A variety of devices have been developed to help lift a wheel into alignment with a wheel hub. Examples of such devices are shown in U.S. Pat. Nos. 4,602,415 to Garcia; 4,949,448 to Hebnes; 5,022,133 to Weitekamp; and 5,479,692 to Barkus. The patents to Hebnes and Weitekamp disclose the use of a tool which fits over a lug bolt and is used to guide a wheel into place. Both of these devices utilize a tool which must be small enough in diameter to fit through a standard hole. This results in a relatively thin wall section in at least a portion of the tool. In a preferred embodiment of the present invention, one of the holes in the wheel is enlarged to receive a larger diameter, stronger tool. In Hebnes, the tool is threadingly engaged with a lug bolt, and a portion of the tool must be pivoted to a position in which the tire must be moved onto the tool. In the present invention, the tire and wheel are positioned adjacent to the wheel hub, and the tool is positioned through the wheel to engage one of the lug bolts. Thus, the apparatus of the present invention is much simpler to use and does not require as much manual manipulation of the wheel as does Hebnes.

The Weitekamp tool has a portion of a thread therein which is used to engage the lug bolt. The present invention utilizes an unthreaded device which is easily slipped over the lug bolt, and a beveled end on the tool may be provided to facilitate use of the tool when it is angularly disposed to the lug bolt.

SUMMARY OF THE INVENTION

The apparatus of the present invention provides various apparatus and methods to facilitate mounting a tire on a vehicle. The various embodiments and aspects of the invention provide that a single person can carry out all steps in changing a wheel and tire on a vehicle without assistance from a helper.

The apparatus may be generally described as a vehicle wheel assembly comprising a wheel hub supported on an axle of the vehicle, a wheel adapted for positioning adjacent to the wheel hub wherein the wheel defines a plurality of holes therein, a plurality of lug bolts of substantially uniform length extending from the wheel hub wherein the lug bolts are adapted for positioning through corresponding ones of the holes in the wheel, and a single support member extending in an axial direction from the hub. The support member is longer than the lug bolts and is adapted for positioning through one of the holes in the wheel, whereby when the support member is located at a topmost position on the wheel hub with respect to the lug bolts, the wheel will hang from the support member such that the others of the holes in the wheel are substantially aligned with the corresponding lug bolts.

In one embodiment, the support member is another lug bolt which is longer than the others of the lug bolts. In another embodiment, the lug bolts are substantially evenly circumferentially spaced with respect to one another, and the plurality of holes defined in the wheel includes a set of holes substantially equally circumferentially spaced from one another in a pattern identical to the lug bolts and further including a separate hole for receiving the support member therethrough. The support member may be spaced from a circumference on which the lug bolts lie, or it may be on that circumference.

In still another embodiment, the support member comprises a guide tube slidably disposed on one of the lug bolts. The guide tube may have a beveled end thereon so that it can be at least partially engaged with the lug bolt when angularly disposed thereto. One of the holes in the wheel is preferably enlarged with respect to the others of the holes such that the guide tube may be disposed therethrough.

In certain embodiments, the apparatus includes a vehicle wheel assembly comprising a wheel hub, a wheel adapted for positioning adjacent to the wheel hub wherein the wheel defines a plurality of holes therethrough with one of the holes having a diameter larger than the other of the holes, a plurality of lug bolts extending from the hub and adapted for engagement through at least some of the holes in the wheel, and a guide tube adapted for positioning through the one hole. The guide tube has an inside diameter adapted for sliding engagement with one of the lug bolts. The guide tube may also have a beveled end whereby the guide tube can be at least partially engaged with the one of the lug bolts when angularly disposed thereto such that the guide tube may be pivoted with respect to that lug bolt, thereby lifting the wheel with respect to the hub by using the guide tube as a lever.

The guide tube may also extend through another hole in the wheel to be engaged with a dedicated stud or guide pin extending from the hub.

In some vehicles, the fastener which holds the wheel to the hub is a cap screw which is completely removed. For such vehicles, a guide tube or bar may be positioned through a topmost wheel hole in the wheel and inserted into a topmost threaded hub hole in the hub. Preferably, the guide bar is beveled to allow it to be inserted into the hub hole at an angle and then subsequently pivoted to raise the wheel into position in which the wheel and hub holes are aligned for reinstalling the cap screws.

The present invention also includes a method for facilitating wheel replacement on a vehicle. This method comprises the steps of providing a support member extending from a wheel hub of the vehicle adjacent to a plurality of lug bolts extending from the hub wherein the support member is longer than the lug bolts, rotating the hub as necessary to locate the support member at a topmost position on the hub with respect to the lug bolts, placing a replacement wheel adjacent to the hub such that the support member extends through a topmost hole defined in the wheel and thereby hanging the wheel from the support member such that the remaining holes defined in the wheel are substantially aligned with the lug bolts, and moving the wheel axially such that the lug bolts are disposed through the respective holes in the wheel.

The method may further comprise, after the step of rotating, a step of locking the hub against rotation. In one form of the method, the step of locking comprises holding a brake pedal of the vehicle in a depressed position. This may include positioning a tool between a steering wheel of the vehicle and the brake pedal.

In one embodiment of this method, the step of providing a support member comprises providing an extended length lug bolt which is longer than the others of the lug bolts. In another embodiment of the method, the step of providing a support member comprises providing a guide tube adapted for sliding engagement over one of the lug bolts. In this latter embodiment, the method may further comprise the step of enlarging one of the holes for receiving the guide tube therethrough.

In another embodiment of this method, the step of providing a support member comprises providing a guide pin on the wheel hub. A guide tube may be provided to extend over the guide pin.

Stated in another way, the present invention also includes a method for facilitating wheel replacement on a vehicle comprising the steps of providing the wheel with an enlarged hole, providing a guide tube having an inside diameter adapted for sliding engagement with one of a plurality of lug bolts extending from a vehicle hub and an outside diameter adapted for sliding through the enlarged lug hole, positioning the guide tube through the enlarged lug hole in the replacement wheel and sliding the guide tube over the one lug bolt such that the wheel hangs from the guide tube, pushing the wheel laterally along the guide tube to engage the enlarged hole with the lug bolt over which the guide tube is positioned and to engage the remaining lug bolts in respective holes defined in the wheel, and removing the guide tube. In this method, the lug bolt engaged by the guide tube is preferably in a topmost position with respect to the wheel hub.

This method may further comprise providing the guide tube with a beveled end such that the guide tube may be at least partially engaged with the one lug bolt at an angle with respect thereto.

Prior to the step of positioning the guide tube, the method may further comprise locking the hub against rotation. In lieu of a helper, this step of locking may comprise positioning a tool between a steering wheel and a brake pedal of the vehicle such that the brake pedal is held in a depressed position.

The present invention may also be described as an apparatus in the form of a kit to be used by vehicle owners for facilitating wheel replacement on a vehicle of the type having a wheel hub and a plurality of lug bolts extending therefrom and a wheel defining a plurality of holes therein adapted for receiving the lug bolts therethrough. This kit comprises a machining tool for enlarging one of the holes, and a guide tube having an outside diameter adapted for positioning through the one hole which is enlarged and an inside diameter adapted for sliding engagement with one of the lug bolts such that the wheel may be hung from the guide tube. The machining tool may be a reamer, but another type of tool, such as a drill, grindstone, mill, etc., could be used. A trepanning tool may be used to enlarge the hole with the wheel and tire in place on the vehicle and a lug bolt extending through the hole.

The apparatus as a kit may also be described as comprising a guide tube adapted for positioning through one of the holes in the wheel and having an outside diameter adapted for sliding engagement with one of the lug bolts and also having a beveled end, whereby the guide tube can be at least partially engaged with one of the lug bolts when angularly disposed thereto such that the guide tube may be pivoted with respect to the one of the lug bolts and the wheel thereby lifted with respect to the hub by using the guide tube.

Numerous objects and advantages of the invention will be evident from the following detailed description of the preferred embodiments read in conjunction with the accompanying drawings that illustrate those embodiments.

BRIEF DESCRIPTION OF THE DRAWINGS

FIG. 1 is a front view in elevation of a vehicle wheel hub incorporating a first embodiment of the tire mounting apparatus of the present invention.

FIG. 2 is a side view in elevation of the wheel hub of FIG. 1.

FIG. 3 is a front view illustrating the manner in which a wheel may be hung on a lug bolt in the first embodiment of the invention.

FIG. 4 is a front view of a vehicle wheel hub incorporating a second embodiment of the tire mounting apparatus of the present invention.

FIG. 5 is a side view in elevation of the wheel hub of FIG. 4.

FIG. 6 shows a front view illustrating the manner in which a wheel may be hung on a lug bolt in the second embodiment of the invention.

FIG. 7 shows a third embodiment of the invention illustrating positioning of a replacement wheel using a guide tube.

FIG. 8 is a front view of the third embodiment showing a tapered lug nut engaging an enlarged hole in a vehicle wheel.

FIG. 9 illustrates the third embodiment utilizing a flat sided lug nut with a washer.

FIG. 10 shows the enlargement of a lug hole in a wheel using a machining tool such as a reamer.

FIG. 11 illustrates the enlargement of a lug hole in a wheel in place on a hub using a trepanning tool.

FIG. 12 shows a fourth embodiment of the invention illustrating the initial positioning of a replacement wheel using an alternate guide tube.

FIG. 13 illustrates use of the fourth embodiment guide tube to lift the wheel into position for engagement with lug bolts.

FIG. 14 shows a detail of an embodiment of the guide tool of FIGS. 12 and 13.

FIG. 15 shows a fifth embodiment of the invention illustrating the initial positioning of a replacement wheel on a hub without lug bolts.

FIG. 16 shows a partial cross section of the interior of a vehicle showing a brake locking apparatus engaged with the vehicle steering wheel and holding the brake pedal in a depressed position.

DETAILED DESCRIPTION OF THE INVENTION

Referring now to the drawings, and more particularly to FIGS. 1–3 a first embodiment of the tire mounting apparatus of the present invention is shown and generally designated by the numeral 10. Apparatus 10 generally includes a typical automotive wheel hub 12 having a face plate 13 and supported by an axle 14 extending from a vehicle (not shown).

Wheel hub 12 has a plurality of threaded studs or lug bolts 16, 18, 20, 22 and 24 mounted thereon in a circumferentially spaced relationship. One of lug bolts 16–24, such as lug bolt 16, is longer and made to extend further from face plate 13 when mounted on wheel hub 12. For example, but not by way of limitation, lug bolt 16 may extend about ¼ inch to about ⅜ inches further than the other lug bolts 18–24. Lug bolt 16 is shown aligned at the topmost position of wheel hub 12, as best seen in FIG. 2. When longer lug bolt 16 is in this topmost position, it provides an aid when changing tires.

FIG. 3 illustrates the operation of this embodiment. During a tire changing sequence, hub 12 is rotated to locate longer lug bolt 16 at the topmost position of wheel hub 12. Of course, this is done after jacking up the vehicle (not shown) and removing the original wheel and tire (not shown). In the case of front wheels on rear-wheel-drive cars or rear wheels on front-wheel-drive cars, wheel hub 12 can be readily rotated. However, for rear wheels on rear-wheel-drive cars or front wheels on front-wheel-drive cars, the vehicle must be securely blocked front and back with the transmission placed in neutral so that the wheel can be rotated as necessary, after which the transmission is returned to the "park" setting for automatic transmissions or in a low gear for manual transmissions. Once the wheel (front or back) is rotated so that lug bolt 16 is at the topmost position, the brake pedal may be locked in a depressed position using a brake pedal locking device, such as shown in FIG. 13 and as further described herein.

Once longer lug bolt 16 has been placed in the topmost position, a spare tire 26 and wheel 28 can be easily installed. For example, replacement wheel 26 having a plurality of wheel lug holes 30 therein can be installed by placing one of holes 30 on longer lug bolt 16 so that wheel 28 hangs down. Thus, longer lug bolt 16 acts as a support member. Gravity causes alignment of the remaining wheel holes 30 with their respective lug bolts 18, 20, 22 and 24. Thereafter, the tire changer need only push laterally against replacement tire 26 and/or wheel 22 to position all wheel holes 30 on respective lug bolts 16–24. After this, lug nuts (not shown) of a kind known in the art are threaded onto lug bolts 16–24 to lock replacement wheel 28 in place for operation on hub 12 of the vehicle.

It is quite often difficult for a person of normal strength to hold a replacement tire 26 and wheel 28 up from the ground while simultaneously aligning wheel holes 30 with the lug bolts. Utilizing a support member, such as longer lug bolt 16, at a center topmost position during the tire changing sequence, the replacement tire and wheel may be positioned to enable virtually anyone to easily slide all of wheel holes 30 onto the respective lug bolts.

Referring now to FIGS. 4–6, a second embodiment of the tire mounting apparatus of the present invention is shown and generally designated by the numeral 44. Apparatus 44 generally includes a typical automotive wheel hub 46 supported on an axle 48 extending from a vehicle (not shown).

Wheel hub 46 has a plurality of threaded studs or lug bolts 50, 52, 54, 56 and 58 mounted thereon in a circumferentially spaced relationship. Each of lug bolts 50–58 is a standard lug bolt, and no modification of the lug bolts is necessary in second embodiment apparatus 44. However, hub 46 is modified from a standard hub in that it has a dedicated stud or guide pin 60 extending therefrom. Guide pin 60 may be fixedly or temporarily attached to hub 46 in a manner known in the art, such as by threaded connection 62, although the invention is not intended to be limited to a threaded connection. Guide pin 60 is longer than lug bolts 50–58, as best seen in FIG. 4. Guide pin 160 is radially spaced from the circumference on which lug bolts 50–58 lie, but the invention is not intended to be so limited.

FIG. 6 illustrates the operation of second embodiment apparatus 44. During a tire changing sequence, hub 46 is rotated to locate guide pin 60 at the topmost position of wheel hub 46. As with the previously described embodiment, this is done after jacking up the wheel of the vehicle (not shown) and removing the original wheel and tire (not shown). Once guide pin 60 has been placed in the topmost position, a replacement tire 64 and wheel 66 can be easily installed. In this case, wheel 66 is a modified wheel in that it has a dedicated guide hole 68 adapted for receiving guide pin 60 therein. Wheel 66 also has a plurality of normal lug bolt holes 70 adapted for alignment and engagement with lug bolts 50–58. Wheel 66 is installed by placing guide hole 68 over guide pin 60 so that wheel 66 is free to hang down. Thus, guide pin 60 provides a support member. Gravity causes alignment of lug bolt holes 70 with their respective lug bolts 50–58. Thereafter, the tire changer need only push laterally against replacement tire 64 and/or wheel 68 to position all lug bolt holes 70 on their respective lug bolts 50–58. After this, lug nuts (not shown) of a kind known in the art are threaded onto lug bolts 50–58 to lock replacement wheel 66 in place for operation on hub 46 of the vehicle.

For second embodiment apparatus 44, once wheel 66 is in place on wheel hub 46, guide pin 60 may be disengaged from the wheel hub as desired, assuming that the guide pin is only temporarily attached to the wheel hub.

Referring now to FIG. 7, a third embodiment wheel changing apparatus is shown and generally designated by the numeral 74. Apparatus 74 utilizes a guide tube 76 in combination with a selected one of a standard set of studs or lug bolts 78 extending from a wheel hub 80 supported on an axle 82. Wheel hub 80 and lug bolts 78 are of standard construction and require no modification in third embodiment apparatus 74.

Guide tube 16 may be made from a length of standard tubing, such as hard drawn copper. For example, but not by way of limitation, guide tube 76 could comprise a hard drawn copper tubing having an outside diameter 84 of approximately ⅝ inch and an inside diameter 86 of approximately ½ inch. Rather than being a hollow tube, guide tube 16 could be a substantially hollow rod with a counterbore having inside diameter 86 of a predetermined length. Inside diameter 86 of such a tube 76 is actually sized so that it will freely slide over any modern day automotive wheel lug bolt 78 having a nominal diameter of ½ inch or less. That is, such a tube 76 with a nominal ½ inch inside diameter 86 will actually slide over a ½ inch normal lug bolt 78 because the tolerances are such that there is a slight amount of clearance. Of course, such a tube 76 would also slide over a ⁷⁄₁₆ inch lug bolt 78. Additionally, tube 76 would fit over a 12 millimeter lug bolt 78, such as used in foreign cars and recent American cars.

Guide tube 76 could also be used with a dedicated stud or guide pin (not shown) similar to guide pin 60 in second embodiment 44.

In FIG. 7, guide tube 76 is shown in a wheel changing position in which inside diameter 86 thereof is in sliding engagement over one of lug bolts 78. In this position, a replacement tire 88 and wheel 90 may be installed. Guide tube 76 is adapted to fit within one dedicated, enlarged wheel hole 92 in wheel 90. Additional smaller wheel holes 94 in wheel 90 are of standard size. This allows guide tube 76 to be made with a sufficient wall thickness so that the guide tube is strong enough to bear the weight of replacement tire 85 and wheel 90. As will be further described herein, standard holes 90 and enlarged hole 92 are also adapted for alignment and engagement with corresponding lug bolts 78.

For new vehicles, hole 92 may be made larger than holes 94 in the manufacturing of wheel 90. Referring to FIG. 10, the enlargement of hole 92 in wheel 90 may also be done by the vehicle owner as a retrofit using a known machining tool 93, such as a reamer 93, and it is only necessary that hole 92 is enlarged enough that outside diameter 84 of guide tube 76 will fit freely therethrough. Machining tool 93 is preferably adapted to be used with a standard hand drill. For vans, buses, trucks, tractors and other heavier equipment that usually employ heavier tires and a greater plurality of lug bolts, it may be necessary to ream hole 92 to a size which will accommodate a larger, stronger guide tube 76.

FIG. 11 illustrates an alternate machining tool and method for enlarging hole 92 in a wheel 90' still mounted on hub 80. Wheel 90' is of a known type which has a plurality of pads 97 thereon which engage hub 80 such that a gap 99 is defined between wheel 90' and hub 80 adjacent to the holes in the wheel. A machining tool 95, such as a trepanning tool 95, is used to enlarge hole 92 with wheel 90' in place. Trepanning tool 95 has a bore 101 therein adapted to fit over lug bolt 78 and has an outer end 103 preferably adapted to be used with a standard hand drill. A plurality of cutting teeth 105 are disposed on the end of trepanning tool 95 opposite outer end 103. By rotating trepanning tool 95 around lug bolt 78, teeth 105 cut into wheel 90' to enlarge hole 92. As with machining tool 93, it may be necessary to size trepanning tool 95 to enlarge hole 92 to a size which will accommodate a larger, stronger guide tube 76 for vehicles such as vans, buses, trucks, tractors and other heavier equipment.

In the operation of third embodiment apparatus 74, the vehicle (not shown) is jacked up far enough for the original tire to clear the ground and be removed. Wheel hub 80 is rotated until any one of lug bolts 78 is in the topmost position. Replacement wheel 90 and tire 88 are rolled into a position adjacent to wheel hub 80 with enlarged hole 92 in the topmost position. Guide tube 76 is then inserted through enlarged hole 92, and inside diameter 86 of guide tube 76 is positioned over the topmost lug bolt 78. In this position, guide tube 76 on lug bolt 78 provides a support member. Wheel 90 can then be easily slid manually along guide tube 76 so that enlarged hole 92 and standard holes 94 are aligned and engaged with the corresponding lug bolts 78.

If necessary, the changer can place one foot against the bottom of tire 88 while simultaneously lifting up on guide tube 76 to move the guide tube into a horizontal position while pushing wheel 90 and tire 88 onto wheel hub 80 with the foot, as a free hand is used to slide the tire and wheel onto lug bolts 78.

Also, if necessary to obtain more leverage, an extension 106 may be engaged with the outer end of guide tube 76. Extension 106 could be adapted to slide over the outer end of guide tube 76 or could be threadingly engaged with a threaded opening (not shown) in the guide tube.

After wheel 90 and tire 88 are so positioned, a lug nut 96 may be engaged with each of lug bolts 78 in a manner known in the art, such as seen in FIG. 8, after which guide tube 76 may be removed from topmost lug bolt 78. Another lug nut 96 may then be engaged with topmost lug bolt 78. Many typical lug nuts 96 have a tapered surface 98 thereon which is directed toward wheel 90. Tapered surface 98 is adapted to fit within standard wheel holes 94 to engage the edge of the holes. Such holes 94 also typically have a tapered matching surface (not shown). Although enlarged wheel hole 92 is larger than standard wheel holes 94, it is still considerably smaller than the outermost radial dimensions of lug nut 96. That is, tapered surface 98 on lug nut 96 will still fit within and engage hole 92. The only difference is that the particular lug nut 96 which engages topmost lug bolt 78 and enlarged hole 92 will thread a little further onto topmost lug bolt 78 than corresponding lug nuts 96 on the other lug bolts 78 which engage standard wheel holes 94.

FIG. 9 illustrates a situation in which wheel 90 is locked onto wheel hub 80 by engagement of flat sided lug nuts 100 with lug bolts 78. In this case, a washer 102 is preferably disposed between lug nut 100 and wheel 90. Washer 102 has a bore 104 therethrough which is smaller than enlarged hole 92 in wheel 90. Preferably, but not by way of limitation, bore 104 is approximately the same diameter as standard wheel holes 94, and washer 102 has an outside diameter greater than the diameter of enlarged hole 92. In this way, proper loading on lug bolts 78 and wheel 90 are maintained even though hole 92 has been enlarged.

With either lug nuts 96 or 100, the strength of the mounting is not compromised to any significant degree, and the contact area is sufficient so that there is still great strength.

Referring now to FIGS. 12 and 13, a fourth embodiment wheel changing apparatus is shown and generally designated by the numeral 110. Apparatus 110 is similar to third embodiment apparatus 74 in that it uses a guide tube 112. Guide tube 112 is substantially similar to guide tube 76 previously described, except that guide tube 112 has a mitered, tapered or beveled end 114 thereon. Guide tube 112 is used in combination with a selected one of a standard set of studs or lug bolts 116 extending from a wheel hub 118 supported on an axle 120. Guide tube 112 could also be used with a dedicated stud or guide pin (not shown) similar to guide pin 60 in second embodiment 44.

Those skilled in the art will see that a length of hollow tubing may be easily cut to form two guide tubes 112 by making a diagonal cut along a longitudinally centrally located point on the tubing. This cut would thus form beveled ends 114 on the resulting two guide tubes 112.

Referring to FIG. 14, an alternate construction of the guide tube, identified by the numeral 112', is shown. In this embodiment, guide tube 112' is not hollow its entire length but rather has a bore 113 therein of a predetermined length and having an end 115. Guide tube 112', which might also be referred to as a guide bar 112', would have greater strength which might be necessary when mounting heavier tire and wheel assemblies.

The remaining discussion related to guide tube 112 is also applicable to guide tube or bar 112'. The inside and outside diameters of guide tube 112 are similar to those on previously described guide tube 76 so that guide tube 112 slides freely over one of lug bolts 116 and slides through an enlarged hole 122 of a wheel 124 having a tire 126 mounted thereon. Wheel 124 also defines a plurality of standard wheel holes 128 therein. Wheel 124 in fourth embodiment apparatus 112 may be substantially identical to wheel 90 in third embodiment apparatus 74. Thus, enlargement of hole 122 in wheel 124 may be done originally by the wheel manufacturer. The enlargement may also be done as a retrofit by the vehicle owner with a machining tool 93 or 95, such as a reamer 93 or trepanning tool 95, as previously described. See FIGS. 10 and 11.

Referring to FIG. 12, beveled end 114 on guide tube 112 allows for easy positioning of the guide tube on the topmost lug bolt 116 even when the guide tube is at an angle to the lug bolt. By lifting on the end of guide tube 112 extending outwardly from wheel 124, the guide tube may be used to lift wheel 124 and tire 126 with a lever action while substantially simultaneously sliding the guide tube further onto the topmost lug bolt 116 as the guide tube becomes closer in axial alignment with the lug bolt as shown in FIG. 13. Thus, guide tube 112 on lug bolt 116 provides a support member. At this point, wheel 124 and tire 126 are moved laterally along guide tube 114 until holes 128 are in alignment and engagement with lug bolts 116.

The length of guide tube 112 or 112' may be lengthened by an extension 130, similar to extension 106 for third embodiment 74, to provide more leverage in lifting wheel 124 and tire 126. See FIG. 14.

Preferably, but not by way of limitation, the vehicle is jacked up so that there is about one inch clearance between the bottom of tire 126 and the ground when wheel 124 is aligned with wheel hub 118.

Lug nuts, such as those shown in FIGS. 8 or 9, can be engaged with the lug bolts adjacent to holes 128. After this, guide tube 112 may be removed, and a lug nut engaged with the topmost lug bolt 116. Thus, those skilled in the art will see that the operation of fourth embodiment apparatus 110 is very similar to that of third embodiment apparatus 74, and in fact is identical in most respects.

Referring now to FIG. 15, a fifth embodiment wheel changing apparatus is shown and generally designated by the numeral 132. In this embodiment, vehicle hub 134 is mounted on an axle 136 in a familiar manner, but wheel 138 is attached to hub 134 by a plurality of cap screws 139 which engage threaded hub holes 140 in hub 134. That is, cap screws 139 are completely removed in the wheel changing process, unlike the lug bolts in the other embodiments described herein.

Fifth embodiment apparatus 132 comprises a guide tube or bar 142 preferably having a beveled end 144 thereon. Guide bar 142 does not require a central opening and is sized to fit within threaded hub holes 144 in hub 134 and in wheel holes 146 in wheel 138. By positioning guide bar 142 through a topmost wheel hole 146 and further positioning beveled end 144 in a topmost hub hole 140, with beveled end 144 facing upwardly as seen in FIG. 15, wheel 138 may be lifted by use of guide bar 142 with a lever action while substantially simultaneously sliding the guide bar further into topmost hub hole 140 to position the wheel in a manner generally similar to the embodiments previously described. Thus, it will be seen that guide bar 142 provides a support member. Wheel 138 and tire 148 may then be moved laterally along guide bar 142 until wheel holes 146 are in alignment with hub holes 140 so that the cap screws 139 may be replaced.

In third embodiment 74, fourth embodiment 110 or fifth embodiment 132, the guide tube or bar 76, 112 or 142 respectively is cantilevered as shown and used as a lever for moving the wheel and tire. However, in the operation of third embodiment 74, fourth embodiment 110 or fifth embodiment 132, the outer end of the guide tube or bar may be supported by a jack or jack stand 149, such as shown in FIG. 13 to act as a beam to facilitate positioning of the wheel on the hub.

As previously described, second embodiment 44 utilizes a guide pin 60, third embodiment 74 uses a guide tube 76, fourth embodiment 110 uses a guide tube 112, and fifth embodiment 132 uses a guide bar 142. In each case, the wheel may be suspended from the support member so that it hangs by gravity from a topmost location to align the holes in the wheel with the lug bolts or holes associated with the corresponding hubs. The present invention also contemplates that for relatively large wheels and tires which are difficult to move, it might be preferable to lift them from more than one point. Therefore, second embodiment 44 could be modified to include a pair of guide pins 60, and third embodiment 74, fourth embodiment 110 and fifth embodiment 132 could be modified to use more than one guide tube 76, guide tube 112 or guide bar 142, respectively. That is, two or more support members could be used to lift heavy wheels and tires. While a single support member has the advantages described, the invention is not intended to be so limited, and multiple support members might be useful in some cases.

Referring now to FIG. 15, the brake locking tool of the present invention is shown and generally designated by the numeral 150. Brake locking tool 150 may be used in lieu of a helper to lock the vehicle brakes during a tire-changing operation. Brake locking tool 150 is designed to be used in the interior of a vehicle 152 between the steering wheel 154 and brake pedal 156 thereof.

Brake locking tool 150 is a simple device which comprises a rod 158 defining a plurality of holes 160 therein and a pin 162 adapted to be positioned in one of holes 160 adjacent to steering wheel 154. Rod 158 has an end 164 adapted to bear against brake pedal 156.

In operation, rod 158 is laid across rim 166 of steering wheel 154. Rod 158 is pushed so that it depresses brake pedal 156, thus locking wheels of vehicle 152. Pin 162 is positioned through one of holes 160. The series of holes 160 allows for use with different vehicles. The return pressure of brake pedal 156 insures that pin 162 bears against steering wheel rim 166, thus keeping the brake pedal at least partially depressed.

Rod 158 may be as simple as a length of wooden rod with holes 160 drilled therein with pin 162 being a large nail.

Those skilled in the art will see that when it is desired to lock the wheels on the vehicle during a tire changing operation to hold the various support members in the topmost position, brake locking tool 150 may be utilized so that the wheels will not rotate accidentally when installing the replacement tire and wheel. Brake locking tool 150 is easily removed from vehicle 152 when desired by simply removing pin 162 so that rod 158 is free.

It will be seen, therefore, that the tire changing apparatus and methods of use are well adapted to carry out the ends and advantages mentioned as well as those inherent therein. While preferred embodiments of the apparatus are described for the purposes of this disclosure, numerous changes in the arrangement and construction of parts in the apparatus and in steps in the methods may be made by those skilled in the art. All such changes are encompassed within the scope and spirit of the appended claims.

What is claimed is:

1. A vehicle wheel assembly comprising:
   a wheel hub supported on an axle of the vehicle;
   a wheel adapted for positioning adjacent to said wheel hub, said wheel defining a plurality of holes therein, said holes including a set of holes substantially equally circumferentially spaced from one another and a separate hole;

a plurality of lug bolts extending from said wheel hub and substantially evenly circumferentially spaced with respect to one another in a pattern identical to said set of holes, said lug bolts being adapted for positioning through corresponding ones of said set of holes in said wheel, said lug bolts being of substantially uniform length;

a single support member extending in an axial direction from said hub, said support member being adapted for positioning through one of said holes in said wheel; and a guide tube disposable through said separate hole in said wheel and over said support member;

whereby, when said support member and said guide tube are located at a topmost position on said wheel hub with respect to said lug bolts, said wheel will hang from said guide tube such that the others of said holes in said wheel are substantially aligned with the corresponding lug bolts.

2. The apparatus of claim 1 wherein said support member is spaced from a circumference on which said lug bolts lie.

3. A vehicle wheel assembly comprising:

a wheel hub;

a wheel adapted for positioning adjacent to said wheel hub, said wheel defining a plurality of holes therethrough, one of said holes having a diameter larger than the other of said holes;

a plurality of lug bolts extending from said hub and adapted for engagement through at least some of said holes in said wheel; and a guide tube adapted for positioning through said one hole, said guide tube having an inside diameter adapted for sliding engagement with one of said lug bolts and also having a beveled end, whereby said guide tube can be at least partially engaged with said one of said lug bolts when angularly disposed thereto such that said guide tube may be pivoted with respect to said one of said lug bolts and said wheel thereby lifted with respect to said hub by using said guide tube.

4. A method for facilitating wheel replacement on a vehicle, said method comprising the steps of:

providing a replacement wheel defining a plurality of holes therein;

enlarging one of said holes;

placing said replacement wheel adjacent to a wheel hub of the vehicle, said hub having a plurality of lug bolts extending therefrom corresponding to said holes in said replacement wheel;

positioning a guide tube through the enlarged hole in said replacement wheel and over one of said lug bolts;

rotating said hub to locate said guide tube at a topmost position on said hub with respect to said lug bolts;

hanging said wheel from said guide tube such that remaining holes defined in said wheel are substantially aligned with said lug bolts; and moving the wheel axially such that said lug bolts are disposed through respective holes in said wheel.

5. The method of claim 4 further comprising:

after said step of rotating, locking said hub against rotation.

6. The method of claim 5 wherein said step of locking comprises holding a brake pedal of the vehicle in a depressed position.

7. The method of claim 6 wherein said step of locking comprises positioning a tool between a steering wheel of the vehicle and said brake pedal.

8. The method of claim 4 further comprising the step of enlarging one of said holes for receiving said guide tube therethrough.

9. The method of claim 4 wherein said guide tube has a beveled end.

10. A method for facilitating replacement of a wheel on a vehicle, said method comprising the steps of:

providing the wheel with an enlarged lug hole;

providing a guide tube having an inside diameter adapted for sliding engagement with one of a plurality of lug bolts extending from a vehicle hub, an outside diameter adapted for sliding through the enlarged lug hole, and a beveled end such that said guide tube may be at least partially engaged with one of said lug bolts at an angle with respect thereto;

positioning said guide tube through the enlarged lug hole in the replacement wheel and sliding the guide tube at said angle over said one of said lug bolts such that the wheel hangs from a single support point formed by the guide tube such that the remaining lug bolts are aligned with respective holes in said wheel;

pushing the wheel laterally along the guide tube to engage the enlarged hole with the lug bolt over which said guide tube is positioned and to engage said remaining lug bolts in said respective holes defined in said wheel; and removing said guide tube.

11. The method of claim 10 wherein said lug bolt engaged by said guide tube is in a topmost position with respect to said wheel hub.

12. The method of claim 10 further comprising:

prior to said step of positioning said guide tube, locking said hub against rotation.

13. The method of claim 12 wherein said step of locking comprises positioning a tool between a steering wheel and a brake pedal of the vehicle such that the brake pedal is held in a depressed position.

14. A vehicle wheel assembly comprising:

a wheel hub supported on an axle of the vehicle;

a wheel adapted for positioning adjacent to said wheel hub, said wheel defining a plurality of holes therein, wherein one of said holes is enlarged with respect to the others of said holes;

a plurality of lug bolts extending from said wheel hub, said lug bolts being adapted for positioning through corresponding ones of said holes in said wheel, said lug bolts being of substantially uniform length; and a guide tube slidably disposed through the enlarged one of said holes and on one of said lug bolts;

wherein, when said guide tube is located at a topmost position on said wheel hub with respect to said lug bolts, said wheel will hang from said guide tube such that the others of said holes in said wheel are substantially aligned with the corresponding lug bolts.

15. The apparatus of claim 14 wherein said guide tube has a beveled end thereon.

* * * * *